US008099710B2

(12) United States Patent
Hill et al.

(10) Patent No.: US 8,099,710 B2
(45) Date of Patent: Jan. 17, 2012

(54) UI BEHAVIORS

(75) Inventors: David P. Hill, Redmond, WA (US); Benjamin S. Wulfe, Redmond, WA (US); M. Scott McCraw, Sammamish, WA (US); Milena Salman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1433 days.

(21) Appl. No.: 11/611,075

(22) Filed: Dec. 14, 2006

(65) Prior Publication Data

US 2008/0147416 A1    Jun. 19, 2008

(51) Int. Cl.
    *G06F 9/44* (2006.01)
(52) U.S. Cl. ....................................... 717/105
(58) Field of Classification Search .............. 717/107, 717/109, 114, 105; 719/315, 318, 328; 715/179, 715/211, 762, 772, 859; 714/819; 705/348; 370/389
    See application file for complete search history.

(56) References Cited

U.S. PATENT DOCUMENTS

| 5,448,740 | A | 9/1995 | Kiri et al. | |
|---|---|---|---|---|
| 6,449,659 | B1 * | 9/2002 | Caron et al. | 719/315 |
| 7,003,482 | B1 | 2/2006 | Margoscin et al. | |
| 7,007,278 | B2 | 2/2006 | Gungabeesoon | |
| 2002/0073059 | A1 | 6/2002 | Foster et al. | |
| 2003/0066047 | A1 | 4/2003 | Watase | |
| 2003/0145124 | A1 * | 7/2003 | Guyan et al. | 709/318 |
| 2004/0046789 | A1 | 3/2004 | Inanoria | |
| 2004/0093593 | A1 | 5/2004 | Jhanwar | |
| 2004/0187140 | A1 * | 9/2004 | Aigner et al. | 719/328 |
| 2004/0226027 | A1 | 11/2004 | Winter | |
| 2005/0071850 | A1 | 3/2005 | Ittel | |
| 2005/0108272 | A1 | 5/2005 | Behrens et al. | |
| 2005/0138650 | A1 | 6/2005 | Hon et al. | |
| 2005/0256882 | A1 * | 11/2005 | Able et al. | 707/10 |
| 2006/0150148 | A1 * | 7/2006 | Beckett et al. | 717/109 |
| 2006/0212842 | A1 | 9/2006 | Gossman | |
| 2006/0280177 | A1 * | 12/2006 | Gupta et al. | 370/389 |
| 2007/0038963 | A1 * | 2/2007 | Moore | 715/859 |

OTHER PUBLICATIONS

Wellhausen, Tim, "Business Logic on the Client-Side Design Patters on the Implementation of Business Logic in Client Applications", Conference draft for EuroPLoP 2006, pp. A6-1-A6-16.
Yu, Jin, et al., "XUPClient—a Thin Client for Rich Internet Applications", Lecture Notes in Computer Science, vol. 4255/2006, 2006, pp. 524-535.
Over HH, Wolfart E, Veragten E, "Data Retrieval and Evaluation within the Web-enabled Alloys-DB", The 19th CODATA International Conference—The Information Society: New Horizons for Science, Berlin, Germany, Nov. 7-10, 2004.

\* cited by examiner

*Primary Examiner* — Tuan Anh Vu
(74) *Attorney, Agent, or Firm* — Workman Nydegger (57) ABSTRACT

Implementing desired business logic functionality. The desired business logic functionality may include a number of individual functions. A number of computer implemented modules are selected. Each module is configured to perform at least a portion of one of the individual functions. Additionally, each module includes a computer implemented interface for connecting to other modules. The implemented modules are connected to create a composite module. The composite module includes functionality for implementing the individual functions. The composite module includes computer implemented interfaces for connecting to other modules, including a UI module. As such, the composite module is reusable in implementing more complex functionality by being selected as a computer implemented module and being connected to other computer implemented modules. The composite module is agnostic to how a UI module exposes functionality to a user.

10 Claims, 2 Drawing Sheets

UI BEHAVIORS

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software UIs to facilitate user interaction. For example, a modern general purpose computer may include a keyboard, mouse, touchpad, camera, etc for allowing a user to input data into the computer. In addition, various software UIs may be available.

Examples of software UIs include graphical UIs, text command line based UI, function key or hot key UIs, and the like. Generally, the UI is an integral part of a software application. Further still, the interface is usually so intertwined in the software application with other software code and spread out through the software application that to modify or update the UI requires numerous code changes throughout the application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes acts for performing a method of implementing desired business logic functionality. The desired business logic functionality may include a number of individual functions. The method includes selecting a number of computer implemented modules. Each module is configured to perform at least a portion of one of the individual functions. Additionally, each module includes a computer implemented interface for connecting to other modules. The implemented modules are connected to create a composite module. The composite module includes functionality for implementing the individual functions. The composite module includes computer implemented interfaces for connecting to other modules, including a UI module. As such, the composite module is reusable in implementing more complex functionality by being selected as a computer implemented module and being connected to other computer implemented modules. The composite module is agnostic to how a UI module exposes functionality to a user.

One embodiment may be implemented in a computing environment. A computer readable storage medium may include computer executable instructions usable in a framework for implementing business logic separated from user interface elements. This allows the business logic and user interface elements to be developed separately and later combined. The computer readable storage medium includes computer executable instructions configured to perform tasks. The computer readable storage medium further includes a computer implemented interface operatively connected to the computer executable instruction configured to perform tasks. The computer implemented interface is configured to connect to an external computer implemented user interface module. The computer implemented interface allows an external computer implemented user interface module to be selected from one of a number of external computer implemented user interface modules.

In another embodiment, computer readable storage may include computer executable instructions configured to perform user interface tasks. The computer readable storage may further include a computer implemented interface operatively connected to the computer executable instruction configured to perform user interface tasks. The computer implemented interface is configured to connect to an external computer implemented module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Some embodiments described herein allow for greater flexibility in designing and implementing controls, by implementing separate UI and business logic portions. Additionally, UI and business logic portions may be comprised of further separated UI and business logic portions. As sometimes used herein, a "part" is a re-usable unit of combination. Parts are granular entities that provide self-contained functionality that can be re-used in many different solutions. They define an external contract using a set of connection points that dictate the ways in which the part may communicate with other parts or with its host environment. Parts can be combined together to form higher value, more complex composite parts. Composite parts can be used just like simple noncomposite parts. Composite parts can use connection points to define their external contract.

Illustratively, a business logic module part may include connection points to allow the business logic module to logically connect to a UI module part. The business logic module part may further include connection points configured to interface with other logic modules. In this fashion, parts can be created and combined to create a structure. Additionally, parts and/or logic module parts and/or UI module parts can be pre-made and supplied as reusable components that can be implemented in an application.

By separating the UI components from the business logic components, several advantages can be obtained. For example, in one embodiment, this allows for custom UIs to be created. Additionally, a UI can be changed individually rather than needing to change code throughout a module to change the UI.

Re-skinning can be accomplished by simply changing the UI part code or by replacing the UI part. Additionally, complete changes in UI technology can be accomplished without the need to re-code the business logic portions of the application. For example, a UI module for a graphical UI for a part may be replaced by a UI module utilizing shortcut keys or function keys.

Embodiments also include functionality for defining hierarchical workspace controls. A workspace control includes layout functionality to allow a workspace UI to be automatically and dynamically updated according to the state of the application.

As explained previously, parts can be re-usable. Thus, in one embodiment, a user can create a structure that includes parts generated by others. Thus, resources can be reused. Additionally, collaboration can be accomplished without the need for excessive developer interaction.

Advantageously, another embodiment facilitates logical development by grouping common parts. For example, a composite part may include a number of sub-parts. The sub-parts may themselves be composite parts where parts with common functionality are grouped together in a single sub-part. The group of common parts may provide for a grouping of available items, which a UI module can represent in any appropriate way. By grouping related parts, a behavior can be created, where the behavior functionality can be defined by the included parts. Specific behavior creations will be discussed further below.

Figure 1:
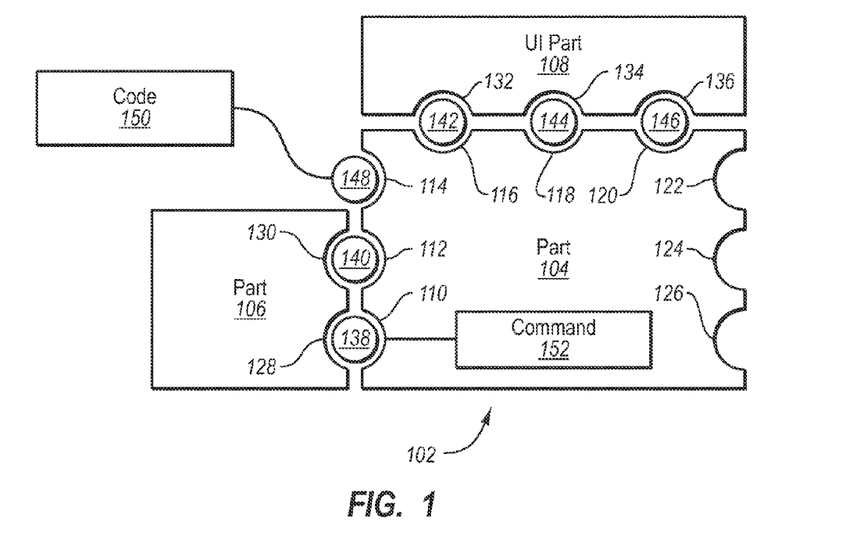
FIG. 1 illustrates a composite part composed of a number of sub-parts and external code.

Referring now to FIG. 1, an exemplary composite part 102 is illustrated. By illustrating the composite part 102, several features of some embodiments can be illustrated. For example, the composite part 102 illustrates how lower level sub-parts can be combined into a composite part. Further, the composite part 102 illustrates how various interfaces can be accomplished between parts and/or other external code.

Illustrating now in more detail, composite part 102 includes three lower level parts, part 104, part 106, and user interface (UI) part 108. The parts are connected using connection points (110-136) and connectors (138-148). The connection points define an external contract that dictates the ways in which a part's container or other parts may interact with the part. Specific connection point types define and encapsulate specific patterns of communication. Exemplary patterns of communication include, for example, notifications, command invocations, data exchanges, etc. Connectors represent connections between connection points, or between connection points and workflows. They provide the channels of communication and the logic to manage the interaction between the parts. Connectors may be specific to connection point type pairs.

FIG. 1 further illustrates that part 104 is connected to code 150. The part 104 is connected to code 150 through connection point 114 and an adapter 148. An adapter connects a part's connection point to external modules such as UI controls or code. Adapters are used to help handle common interaction scenarios between connection points and other elements of the system. For example, adapters can be used to connect a UI control to a command connection point on a part. This adapter can then automatically manage the control so that its properties or events can be interfaced with the connection point without a significant amount of developer generated code.

FIG. 1 further illustrates a command 152 at part 104 connected through a connection point 110, a connector 138, and a connection point 128 to part 106. A command encapsulates an action that can be carried out by the user. Commands are contained within a part. A part can choose to expose a command via a command connection point so that the command can be invoked by other parts or by the part's hosting environment. Command connection points can define a number of properties. For example, a command connection point may define the following properties: Enabled (specifying whether or not the command is enabled), Name (an identifying name used during design time and for diagnostics at run time), Description (a description of the command functionality), Icon (specifies an icon that can be used by a designer), etc. In one embodiment, the properties can be modified at any time by the part. The command connection point can transmit these property changes, via the connectors or adapters they are connected to, to other parts, code or UI elements so that they can be notified automatically as the command's state changes.

As alluded to above, several different types of connection points may be implemented. Some illustrative examples are command connection points, data connection points, and navigation connection points. Command connection points have been described previously in connection with the description of command 152 above. A data connection point encapsulates data exchanged between parts. Once the connection point has been connected to another part, the connection point may handle updating the contents of the data using several patterns of data exchange. Navigation connection points are connection points that define a navigation model, as discussed in more detail below, defining what navigation items can be navigated to and proffers events when entries change their state.

Different behaviors can be implemented by combining parts with the desired functionality to create a composite part. UI behaviors can be implemented by connecting the composite part to a UI part. The following sections describe a number of behaviors that can be implemented and specific actions for implementing the behaviors. Notably, the behaviors listed are not intended to be exhaustive, but rather simply illustrate some behaviors that can be implemented. In the examples illustrated below, behaviors are illustrated for command behaviors, data behaviors, navigation behaviors, and notification behaviors.

Command Behaviors

A command is an identifiable action—such as Save, Open, Refresh, etc—that the user can carry out within an application. A part implements a command UI behavior when it wants to express to its view that there is an action that can be represented and invoked via the UI. A UI designer can then choose how to best represent command accessibility in the UI according to the target audience, look and feel, style, etc. A designer may choose to represent the command in many different ways. For example, a designer may choose to represent a command graphically such as by representing a toolbar button or menu item in a graphical UI. Other non-graphical representations or accessibility options may be implemented such as for example, a shortcut key, hot key, mouse movement pattern, video input, etc. A designer may choose to represent a command in one or more ways simultaneously, such as by allowing a command to be invoked through any one of a menu item, as a toolbar button, and through a function key.

In one embodiment, the implemented commands support parameters and return values. This allows the UI to use data binding to provide parameters and to display return values as appropriate.

Commands can be invoked synchronously or asynchronously. As will be described further herein below, in one embodiment, a command can use one or more execution modes, such as a serial execution mode, a parallel execution mode, a queued execution mode, a merged execution mode, a batched execution mode or the like. Each of these modes is described in more detail below. Further, a command can be cancelable and report progress. While the command is being carried out asynchronously, the command makes progress information available to the UI that it can then display to the user in whatever form is appropriate to the application. In one embodiment, a user may cancel a running command at any time. In some embodiments, the command may be configured to prevent this.

In one embodiment, the following properties methods and events may be implemented using an internal interface when implementing command behaviors:

An "ExecuteCommand" event that is invoked when the operation is initiated. This is fired on a background thread if the UI behavior has been configured for asynchronous execution, and on a UI thread otherwise.

A "CommandCanceled" property that is set to true if the user (view) has requested that the operation be canceled. This property is checked periodically by the "ExecuteCommand" event handler to see if the operation should continue to execute or not.

A "CommandProgress" property that the "ExecuteCommand" event handler can use to report progress.

"Name," "Description," "Tooltip," "Icon," "Enabled," "Cancelable," "ReportsProgress," "HelpURI" properties. The properties allow the part to enable or disable the command and set general properties.

A Command UI behavior may include an external interface, which may be accessible by a part view, with the following properties, methods and events:

An "ExecutionMode" property that indicates the configured execution mode of the UI behavior.

An "ExecuteCommand" method that allows the view to initiate the command synchronously. This method will return immediately if the UI behavior has been configured for asynchronous execution. If the behavior has been configured for synchronous execution, it will return once the command is complete.

A "CancelCommand" method that allows the view to attempt to cancel an executing command. This method will return immediately if the UI behavior has been configured for asynchronous execution pending cancellation of the command, otherwise it will do nothing.

A "CommandStatus" property that indicates whether or not the command is running, not yet started, or is in the process of being canceled. The behavior also implements a corresponding "CommandStatusChanged" event that is fired on the UI thread.

A "Progress" property and a "ProgressChanged" event that indicates the current progress of an executing command. This event is fired on the UI thread. This event will only be fired if the UI behavior has been configured for asynchronous execution.

"Name," "Description," "Tooltip," "Icon," "Enabled," "Cancelable," "ReportsProgress," "HelpURI" properties—General properties that the view can use to customize the actual representation of the command in the UI.

Long running operations may be performed by a part in the background. Typically, a user may cancel such a long running operation at any time. Examples of this kind of operation include operations that involve lengthy calculations or CPU or I/O intensive operations.

Data Behaviors

A part will very often retrieve data from an external or remote source. For example, data may be retrieved via a web service or remote database connection. The retrieved data will then be displayed in a UI. The data may be retrieved, for example, in response to some UI event. For example, when a user clicks on a refresh button, or when the UI is first initialized, data may be retrieved for display on the UI. While other data retrieval patterns can be implemented, three exemplary data retrieval patterns are illustrated herein. A part may retrieve all of the data it needs in one request; or it may retrieve the data in portions so that it can display the data in pages; or it may pre-fetch data that it expects the user to need soon.

The following are some representative scenarios:

Simple Data Retrieval—A part retrieves data in a single request and binds it to a UI. The data may be simple or small, for example a single string, or large or complex, for example a large data set.

Master-Detail—The part retrieves detailed data based on a user's selection of a master record. For example, a user selects a customer and a part then displays detailed order information for that customer.

Load on Demand—A part defers loading of data until it is explicitly required by a user. For example, a part might have a tab that is to display customer order history information. This data is not retrieved unless and until the user selects the tab.

Paging—A part retrieves data in chunks and displays the data in pages to a user. In one embodiment, a user is then able to browse the data by moving forwards or backwards through the pages of data. Individual pages may be loaded when they are required. In one embodiment, while only individual pages are loaded, the part is able to determine the total number of pages so that it can display 'Page 1 of x' feedback information.

Pre-Fetching Data—This particular embodiment is an enhancement to the Paging scenario described above where the UI pre-fetches data that it anticipates will be required soon. For example, if a part is displaying a customer list in pages, it can pre-fetch the next page of customer information so that when a user wants to display that next page, the data has already been retrieved.

The following sections describe UI behaviors that support the three scenarios described above. In the embodiments illustrated, each of the behaviors allow asynchronous data retrieval by providing a simple to use mechanism for retrieving data on a background thread, thereby allowing the UI to remain responsive while the data is retrieved.

The following behaviors also support an execution mode configurable property which allows the behaviors to provide a simple locking mechanism to help reduce the burden of complexity on a part developer. While behaviors may default to asynchronous operation, they can be configured to operate synchronously if a part developer is unwilling or unable to implement the necessary locking to prevent data corruption or race conditions.

Simple Data UI Behavior

A simple data UI behavior can be implemented to allow a part to retrieve data and make it available to the UI for display. Typically data retrieval is carried out asynchronously allowing the UI to maintain responsiveness so this behavior defaults to asynchronous operation, though the developer can change its operation to be synchronous if desired. More elaborate data retrieval behaviors can build on the basic functionality that this behavior provides. For example the paged data retrieval behavior described below can be an extension of a simple data UI behavior.

In one exemplary embodiment, an asynchronous data retrieval UI behavior defines an internal interface with the following properties, methods and events:

A "RetrieveData" event. This event will typically be fired on a background thread. The event arguments may contain any parameters that can be used to retrieve the data. This is fired on a background thread if the UI behavior has been configured for asynchronous execution, and on a UI thread otherwise.

A "PublishData" method. This allows the part to make data available to the view. This method will typically be called within the event handler for the "RetrieveData" event.

A "Canceled" property that is set to true if the user, through the view, has requested that the data retrieval operation is to be canceled. This property is checked periodically by the "RetrieveData" event handler to see if the data retrieval operation should continue. If the UI behavior has been configured for synchronous execution, this property is false.

A "Progress" property that the "RetrieveData" event handler can use to report progress if applicable. If the UI behavior has been configured for synchronous execution, this property is zero.

The asynchronous data retrieval UI behavior defines an external interface, accessible by the view, with the following properties, methods and events:

A "GetData" method that allows a view to initiate a data retrieval operation. In one embodiment, this method will return immediately if the UI behavior has been configured for asynchronous execution. If the behavior has been configured for synchronous execution, it will return once the data retrieval operation is complete.

A "Data" property that allows the UI to access or bind to the data. The behavior also implements a "DataChanged" event that is fired on the UI thread. The UI is able to bind directly to this data.

A "Cancel" method that allows a view to attempt to cancel an executing data retrieval operation. This method will return immediately if the UI behavior has been configured for asynchronous execution pending cancellation of the operation, otherwise it will do nothing.

A "Status" property that indicates whether or not the data retrieval operation is not running, in progress, or is in the process of being canceled. The behavior also implements a corresponding "StatusChanged" event that is fired on the UI thread.

An "ExecutionMode" property that indicates the configured execution mode of the UI behavior.

A "ProgressChanged" event that indicates the current progress of an executing data retrieval operation. This event is fired on the UI thread. This event will only be fired if the UI behavior has been configured for asynchronous execution.

Paged Data UI Behavior

The paged data retrieval behavior is an enhancement to the basic asynchronous data retrieval behavior described above. The paged data retrieval behavior makes the data available to the UI in 'pages' so that the user is able to navigate forward and backward through the available pages using a suitable UI. The paged data retrieval behavior keeps track of how many total pages there are and which page is the current one. The form or part developer can choose whether to load the entire data and then just makes pages of it available to the view, or they can choose to load pages as they are needed.

The page data retrieval UI behavior includes properties, methods and events in addition to those described above for simple data UI behavior. The internal interface (accessible by the implementing part) adds the following properties, methods and events:

A "NumberOfPages" property—An integer property that allows the part to set the number of pages.

A "PublishData" method which takes an integer parameter specifying the current page number. This allows the part to make data available to the view. This method will typically be called within the event handler for the "RetrieveData" event. Another overload of this method takes two parameters—one for the current page number, and one for the total number of pages.

The external interface (accessible by the view) adds the following properties, methods and events:

A "NumberOfPages" property—An integer property that specifies the total number of pages available.

A "CurrentPage" property—An integer property that specifies the current page number.

A "NextPage" method and a "PreviousPage" method—allows the view to navigate to the next and previous pages of data.

A "GotoPage" method—Allows the view to navigate to a specific page of data

Pre-Fetch Paged Data UI Behavior

A paged data retrieval behavior can also be configured to pre-fetch pages asynchronously. In one embodiment, the behavior will store two additional pages of data—the page before the current one, and the following page. When a user navigates forward or backward, these pages are made current and the two adjacent pages are asynchronously retrieved.

The internal interface (accessible by the implementing part) adds the following properties, methods and events to the page data retrieval UI behavior:

A "NextPageAvailable" property—This property is set to true when the next page of data is available.

A "PreviousPageAvailable" property—This property is set to true when the previous page of data is available.

The external interface (accessible by the view) adds the following properties, methods and events:

A "PreFetchData" property—This property allows the view to specify whether data pre-fetching is enabled or disabled.

A "NextPageAvailable" event—This event fires when the next page of data is available.

A "PreviousPageAvailable" event—This event sires when the previous page of data is available.

Navigation Behaviors

Figure 2A:
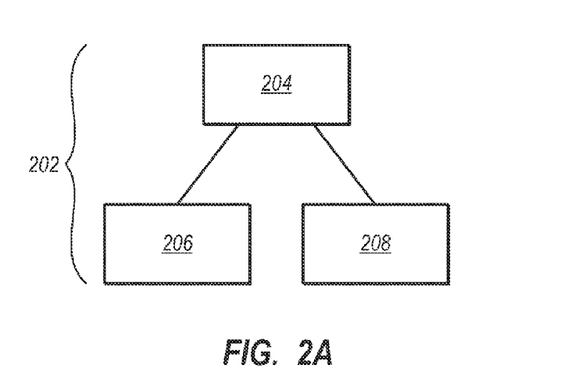
FIG. 2A illustrates a hierarchical navigation structure.
Figure 2B:
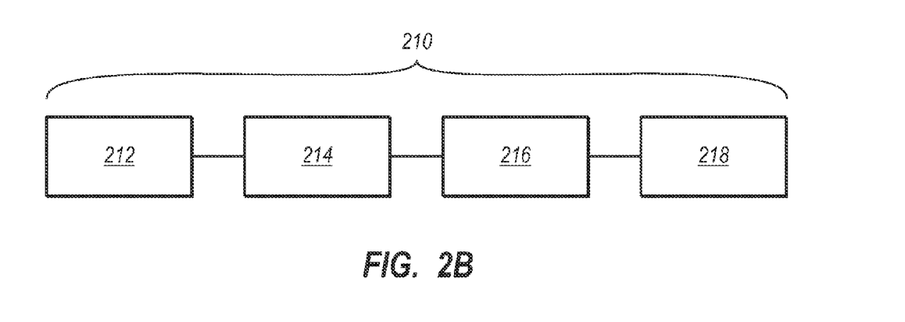
FIG. 2B illustrates a flat navigation structure.

Referring now to FIGS. 2A and 2B, examples of how parts may be used in implementing navigation structures is illustrated. A navigation structure may be defined to define how UI elements are displayed and/or accessed and how user interaction with the UI elements controls the underlying business logic to perform some navigation task. For example, a navigation structure 202 is illustrated. The navigation structure 202 includes navigation items 204, 206, and 208.

Each navigation item may include one or more parts such as those illustrated in FIG. 1. For example, a navigation item may include a business logic part such as part 104 and a UI part, such as part 108. Notably, in some embodiments, a UI part may be shared by different business logic parts. A navigation item, such as navigation items 204, 206, and 208, represents an item that can be navigated to. A navigation item will return a view when navigated to. The view can be displayed or otherwise interacted with, such as with hotkeys, mouse movements, video input, voice commands, etc.

The navigation item can also offer state settings that can be acted on. Such state settings may include settings such as "active" (defining whether or not the navigation item is active), "created", and a "can navigate to" setting (specifying that the navigation item can be navigated to).

As illustrated in FIG. 2A, navigation items can be arranged in a navigation structure in a hierarchical structure. In the hierarchical navigation structure 202, navigation items can be parents to other items. For example, navigation item 204 is a parent to navigation items 206 and 208.

FIG. 2B illustrates an example where navigation items 212, 214, 216, 218 are arranged in a flat navigation structure 210. This may be used, for example to implement a wizard interface where navigation is performed from one interface to the next until a given task has been completed. Notably, in the navigation structure 210 navigation items may be a parent or child of another navigation item. For example, when navigation item 212 is active, navigation item 214 may be a child to navigation item 214. However, when navigation item 214 is active, navigation items 214 may be a parent to navigation item 212.

Illustrating now an exemplary method of assembling a navigation structure, a developer may wish to add child or related navigation items. Notably, as discussed previously, navigation items may be implemented using simple or composite parts such as those illustrated in FIG. 1. Navigation connection points can be used to implement certain functionality. For example, navigation connection points may provide methods that activate and deactivate child parts, such as in the hierarchical navigation structure 202. In the flat navigation structure 210, navigation connection points may control the activation state of other parts when a new part is navigated to. For example, navigation connection points can be used to deactivate the previous part when stepping through a wizard navigation. Navigation connection points can provide a property that describes the navigation structure. In one embodiment, this may be stored as a tree of navigation entries. Additionally, navigation connection points can provide events that fire when child parts are activated or deactivated. This allows a navigations structure's view to respond to these events and display or hide a child's view as needed.

A more detailed description of navigation behaviors is described in U.S. patent application Ser. No. 11/609,694 titled "Navigation Connection Points" filed Dec. 12, 2006 and included herein in its entirety by reference.

Notification Behaviors

Notification UI behaviors can be implemented as simple behaviors that represent an event to which a UI can choose to respond. They can be used in situations where the part has to inform the view that something interesting has happened so that the view can be updated accordingly. The notification event is fired on the UI thread. The notification can be used to define a parameter.

Synchronous/Asynchronous Behaviors

Connection points can be usable in a synchronous or an asynchronous manner. They can provide a synchronous and an asynchronous API for the operations they define. A view or external parts can choose to call the connection point synchronously or asynchronously according to a developer's requirements and/or skill level.

Connection points that are called asynchronously can report progress, such as via an event, so that the view can provide visual feedback to the user while an asynchronous operation is being executed. Connection points may also be configured to allow an executing operation to be canceled. In one embodiment, the connection point will attempt to cancel the operation and then inform the view or external part if the operation was successfully canceled or not.

A connection point may define and maintain state. This state can be used by the view or by external or the parent part as appropriate. For example, a UI behavior that represents a long running operation may define an "enabled" property that the view can query to see if an operation can be started at that time. A UI behavior that represents data can make the data available as state that can then be bound to the UI using whatever data binding mechanism is available.

For connection points that are called in an asynchronous manner, the connection point processes requests that are sent to it by the view or an external part on a separate thread. To minimize the burden of multi-threaded programming, in one embodiment, connection points can queue requests and process them in a number of different ways.

In one embodiment, connection points that are called in an asynchronous manner can be configured to process requests in a certain way by specifying its "Operation Execution Mode". This allow a developer to specify whether or not requests are to be executed in series or in parallel, or whether they are to be queued, merged, or batched. This allows connection points to provide a great deal of flexibility allowing them to be configured to match specific application scenarios. The following are various examples of asynchronous operations.

Serial Execution—A UI behavior can be configured to only allow one request to be processed at a time. Any attempt to send a second request while a previous one is being processed will result in a run-time exception. Examples of this kind of behavior may include 'Submit' operations where the operation should be executed at most once and where it wouldn't make sense to allow the operation to be executed while a previous operation is in progress. This execution mode provides a locking mechanism, removing the burden on the part developer to provide suitable locking logic within the operation's implementation because it will only ever be executed by one thread at a time.

Parallel Execution—A UI behavior can be configured to process multiple requests in parallel. This allows the view to send as many requests as it likes and each one is executed in parallel by the behavior. Results from each request are passed back to the view via callback events (which may be out of order with respect to the original requests). In this case, a part developer ensures that the operation implements suitable locking to prevent internal data corruption since the same operation is executed simultaneously on multiple threads. Examples of this kind of behavior may include lengthy operations or asynchronous data retrieval based on a per-request query or parameter, for example a tax calculated based on a zip code, or retrieval of customer details whose surname begins with a specific letter, etc.

Queued Execution—A UI behavior configured for queued execution which allows the view to queue up multiple requests. Each request is then handled in series in the order in which they were received. This is similar to the serial execution mode but does not result in a run-time exception if more than one request is sent while a previous request is being executed. Again, this kind of execution provides a simple locking mechanism allowing a part developer to write simpler code that will not be executed on multiple threads simultaneously. Examples of this type of operation may include lengthy operations or asynchronous data retrieval.

Merged Execution—A UI behavior can be configured to allow multiple requests to be merged. This is suitable for operations that such a 'Refresh' or 'Sync' operations where multiple requests occurring very close to each other can be merged into a single request and thereby handled more efficiently. This also allows the part to efficiently handle over enthusiastic users who press the Refresh button multiple times.

Batched Execution—Batched execution allows a UI behavior to process multiple requests at one time. The behavior, for performance or efficiency reasons, may only need to execute once it has a sufficient number of requests.

Figure 3:
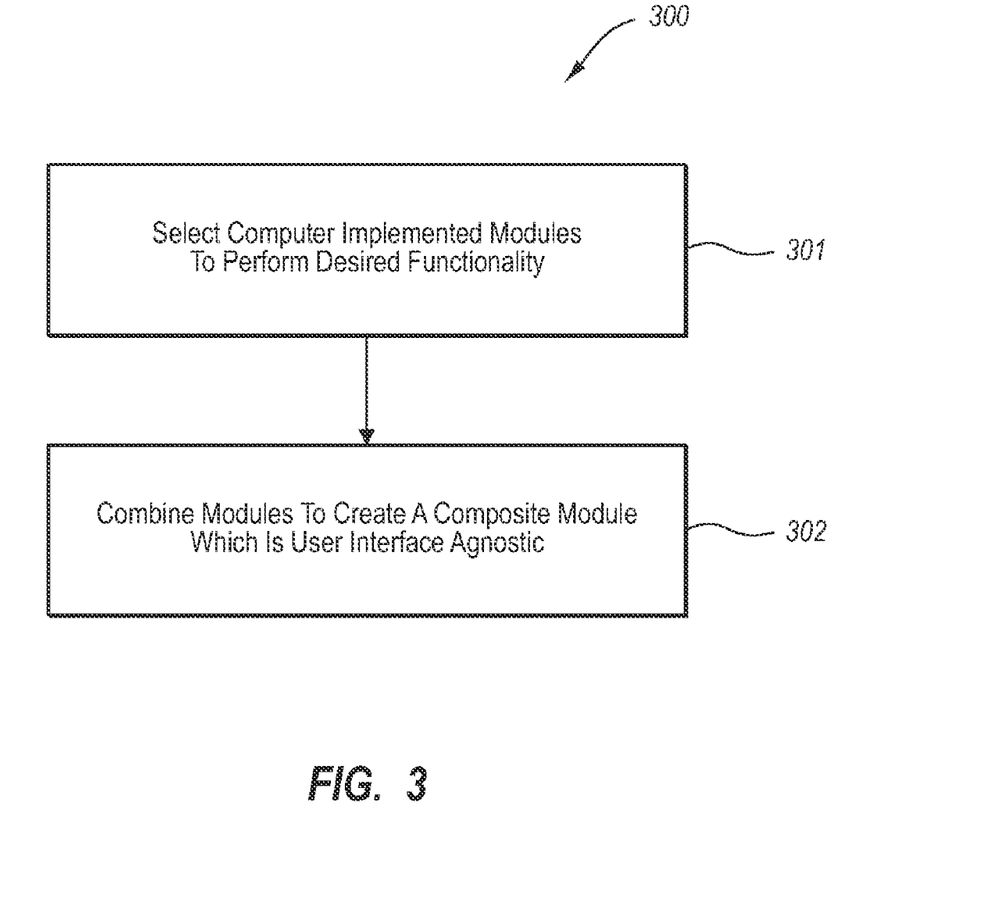
FIG. 3 illustrates a method of implementing desired business logic functionality.

Referring now to FIG. 3, a method of implementing desired business logic functionality is illustrated. The desired business logic functionality may include a number of individual functions. The method 300 illustrates an act of selecting computer implemented modules to perform desired functionality (act 301). Each module is configured to perform at least a portion of one of the individual functions. Each module includes a computer implemented interface for connecting to other modules.

The method 300 further illustrates an act of combining the selected modules to create a composite module (act 302). The composite module includes functionality for implementing the individual functions. The composite module also includes computer implemented interfaces, such as interfaces 110-120 illustrated in FIG. 1, for connecting to other modules, including a UI module, such that the composite module is reusable in implementing more complex functionality. Specifically, the complex module may be selected as a computer implemented module and be further combined with other computer implemented modules. The composite module is agnostic to how a UI module exposes functionality to a user. In other words, a UI may implement any appropriate technology for exposing functionality to a user.

In one embodiment, the combining the computer implemented modules to create a composite module may be performed without recompiling software code. Rather, the individual modules may be implemented in a framework that allows for module combination. Thus, a UI designer can efficiently and simply create a UI without the need for extensive knowledge of the underlying code.

In one embodiment, the method 300 may further include connecting a UI module to the composite module by coupling to a computer implemented interface at the composite module. The UI module is configured to expose functionality of the composite module to a user.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

For example, in one embodiment, a computer readable storage medium may include computer executable instructions usable in a framework for implementing business logic separated from user interface elements such that the business logic and user interface elements can be developed separately and later combined. The computer readable storage media may include computer executable instructions configured to perform tasks. For example, computer executable instructions may be configured to implement the business logic part 104 where the business logic part 104 is configured to perform a task.

The computer readable storage media may further include instructions for implementing a computer implemented interface operatively coupled to the computer executable instruction configured to perform tasks. For example, the connection points 110-126 may implement one or more computer implemented interfaces. The computer implemented interface may be configured to connect to an external computer implemented user interface module. For example, the connection points 116-120 may be configured to connect to user interface parts such as UI part 108. The computer implemented interface may allow an external computer implemented user interface module to be selected from one of a number of external computer implemented user interface modules. In particular, a UI part may be selected from one of a number of different UI parts. In one embodiment, the UI part may implement a user interface that is a graphical user interface. In another embodiment, the user interface may implement an interface based on hot keys. Still other embodiments may include voice commands, mouse movements, video input, tablet input, touch screen input, or any other suitable input.

In one embodiment, the computer executable instructions configured to perform tasks are user interface agnostic. For example as illustrated in FIG. 1, the business logic part 104 is not concerned with how input is received from the UI part 108 or how data is displayed or otherwise presented at the UI part 108, but rather is only concerned with the UI part's ability to comply with the contractual requirements of the connection points 116-120.

In one embodiment, computer executable instructions configured to perform tasks include one or more groups relating one or more properties, methods and/or events. For example, the business logic part 104 may be a composite part that includes a number of sub-parts with related functionality.

The computer executable instructions configured to perform tasks may be configured to perform tasks asynchronously. For example, as described above, various controls and operation modes may be implemented to ensure that errors do no occur during asynchronous operation. In one embodiment, asynchronous operation may be facilitated when the computer executable instructions configured to perform tasks are configured to report progress via an event.

The computer readable storage medium may also include a computer implemented connection interface connected to the computer executable instructions configured to perform tasks such that the computer implemented connection interface is configured to interface with other computer executable instructions configured to perform tasks. For example, as described above a composite part may be created by connecting connection points on sub parts. The connection points may function as the computer implemented connection interface connected to the computer executable instructions configured to perform tasks.

The computer implemented connection interface may be derived from a common set of properties, methods and events. The common properties methods and events can then be customized for a particular application.

In another embodiment, computer executable instruction may be implemented on computer readable media to implement user interface functionality. For example, a computer readable storage media may include computer executable instructions configured to perform user interface tasks. For example, computer executable instructions may be configured to perform the functionality of the UI part 108 described above.

The computer readable storage medium may further include a computer implemented interface operatively connected to the computer executable instruction configured to perform user interface tasks. The computer implemented interface is configured to connect to an external computer implemented module. For example, the connection points 132, 134 and 136 may function as a computer implemented interface configured to connected to an external computer implemented module, such as the business logic part 102.

The computer executable instructions configured to perform user interface tasks may include a graphical user interface, such as the interface illustrate at 320 in FIG. 3. When a graphical user interface is implemented, the computer executable instructions may be configured to implement toolbar buttons, checkboxes, interactive buttons, menu items, etc.

The computer executable instructions configured to perform user interface tasks may also implement user interface items that have no or fewer graphical interfaces. For example, the computer executable instructions configured to perform user interface tasks may include one or more shortcut key commands, mouse interactions, voice commands, video input commands, graphics tablet commands, etc.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of creating an application as a composite part comprising a plurality of interconnected parts including a business logic part, a user interface part, and one or more connectors for connecting the user interface part to the business logic part, the composite part enabling a developer to create a business logic part that implements desired business logic functionality and another developer to create a user interface part that implements a user interface design independently of one another, the method comprising:

creating a business logic part that defines two or more commands that the business logic part is designed to execute;

creating, within the business logic part, a connection point for each of the two or more commands that defines an internal interface through which the business logic part exposes the corresponding command to enable the corresponding command to be invoked by another part;

creating a user interface part that defines one or more user interface components to be displayed within a user interface;

creating, within the user interface part, a connection point, for each of the one or more user interface components, that defines an external interface through which the corresponding user interface component invokes one of the one or more commands defined in the business logic part when the user interface part is connected to the business logic part; and creating, for each connection point in the user interface part, a connector that connects the corresponding connection point of the user interface part to a connection point of the business logic part, the connector comprising adaptor code that includes a first interface for interfacing with the external interface of the corresponding connection point defined within the user interface part and a second interface for interfacing with the internal interface of the corresponding connection point defined within the business logic part, the first and second interface adapting communications between the external and internal interfaces to thereby allow the command exposed by the corresponding connection point of the business logic part to be invoked when the corresponding user interface component is selected in the user interface;

creating a second user interface part that defines one or more user interface components to be displayed within a user interface;

creating, within the second user interface part, a connection point, for each of the one or more user interface components, that defines an external interface through which the corresponding user interface component invokes one of the one or more commands defined in the business logic part when the second user interface part is connected to the business logic part; and replacing the user interface part with the second user interface part by creating, for each connection point in the second user interface part, a connector comprising adaptor code that includes a first interface for interfacing with the external interface of the corresponding connection point defined within the second user interface part and a second interface for interfacing with the internal interface of the corresponding connection point defined within the business logic part, the first and second interface adapting communications between the external and internal interfaces to thereby allow the command exposed by the corresponding connection point of the business logic to be invoked when the corresponding user interface component is selected such that the second user interface part can be plugged into the composite part without modifying the business logic part by using the connector for each connection point in the second user interface part to adapt to each connection point in the business logic part to thereby enable the second user interface part to be plugged in to the composite part without modifying the business logic part.

2. The method of claim 1, wherein replacing the user interface part with the second user interface part is performed without recompiling software code that defines the business logic part.

3. The method of claim 1, wherein the connection point for at least one of the one or more commands defined in the business logic part enables asynchronous operation.

4. The method of claim 1, wherein the one or more commands include one or more of a save command, an open command, a refresh command, a close command, or a print command.

5. The method of claim 1, wherein the internal interface defines:
an execute command event that when invoked causes the corresponding command to be executed;
a command canceled property that when invoked causes the corresponding command to be canceled; and
wherein the external interface defines:
an execute command method that when invoked by the user interface part causes the execute command event of the internal interface to be invoked; and
a cancel command method that when invoked by the user interface part causes the command canceled property of the internal interface to be invoked.

6. In a computing environment, a computer readable storage device comprising computer executable instructions usable in a framework for creating an application as a composite part comprising a plurality of interconnected parts including a business logic part, a user interface part, and one or more connectors for connecting the user interface part to the business logic part, the composite part enabling a developer to create a business logic part that implements the implementation of desired business logic functionality and another developer to create a user interface part that implements a separate from the implementation of user interface design independently of one another, wherein the computer executable instructions implement the following acts when executed within the computing environment:
creating a business logic part that defines two or more commands that the business logic part is designed to execute;
creating, within the business logic part, a connection point for each of the two or more commands that defines an internal interface through which the business logic part exposes the corresponding command to enable the corresponding command to be invoked by another part;
creating a user interface part that defines one or more user interface components to be displayed within a user interface;
creating, within the user interface part, a connection point, for each of the one or more user interface components, that defines an external interface through which the corresponding user interface component invokes one of the one or more commands defined in the business logic part when the user interface part is connected to the business logic part; and
creating, for each connection point in the user interface part, a connector that connects the corresponding connection point of the user interface part to a connection point of the business logic part, the connector comprising adaptor code that includes a first interface for interfacing with the external interface of the corresponding connection point defined within the user interface part and a second interface for interfacing with the internal interface of the corresponding connection point defined within the business logic part, the first and second interface adapting communications between the external and internal interfaces to thereby allow the command exposed by the corresponding connection point of the business logic part to be invoked when the corresponding user interface component is selected in the user interface;
creating a second user interface part that defines one or more user interface components to be displayed within a user interface;
creating, within the second user interface part, a connection point, for each of the one or more user interface components, that defines an external interface through which the corresponding user interface component invokes one of the one or more commands defined in the business logic part when the second user interface part is connected to the business logic part; and
replacing the user interface part with the second user interface part by creating, for each connection point in the second user interface part, a connector comprising adaptor code that includes a first interface for interfacing with the external interface of the corresponding connection point defined within the second user interface part and a second interface for interfacing with the internal interface of the corresponding connection point defined within the business logic part, the first and second interface adapting communications between the external and internal interfaces to thereby allow the command exposed by the corresponding connection point of the business logic to be invoked when the corresponding user interface component is selected such that the second user interface part can be plugged into the composite part without modifying the business logic part by using the connector for each connection point in the second user interface part to adapt to each connection point in the business logic part to thereby enable the second user interface part to be plugged in to the composite part without modifying the business logic part.

7. The computer readable storage device of claim 6, wherein replacing the user interface part with the second user interface part is performed without recompiling software code that defines the business logic part.

8. The computer readable storage device of claim 6, wherein the connection point for at least one of the one or more commands defined in the business logic part enables asynchronous operation.

9. The computer readable storage device of claim 6, wherein the one or more commands include one or more of a save command, an open command, a refresh command, a close command, or a print command.

10. The computer readable storage device of claim 6, wherein the internal interface defines:
an execute command event that when invoked causes the corresponding command to be executed;
a command canceled property that when invoked causes the corresponding command to be canceled; and
wherein the external interface defines:
an execute command method that when invoked by the user interface part causes the execute command event of the internal interface to be invoked; and
a cancel command method that when invoked by the user interface part causes the command canceled property of the internal interface to be invoked.

* * * * *